Patented Aug. 17, 1948

2,447,164

UNITED STATES PATENT OFFICE 2,447,164

CHROMABLE MONOAZO DYES

Achille Conzetti, Basel, Switzerland, assignor to J. R. Geigy A.-G., Basel, Switzerland No Drawing. Application April 5, 1946, Serial No. 659,887. In Switzerland April 17, 1945

3 Claims. (Cl. 260—197)

It has been found that, when coupling diazotised 4-chlor-5-nitro-2-aminophenol-6-sulfonic acid, which may further be substituted in 3-position by chlorine, with 5:8-dichlor-1-naphthol, valuable new dyestuffs will be obtained.

As diazo components may be enumerated 4-chlor-5-nitro-2-aminophenol-6-sulfonic acid or 3:4-dichlor-5-nitro-2-aminophenol-6-sulfonic acid.

The new dyestuffs are dark blue powders dissolving in water with a violet coloration and in sulfuric acid with a dark green coloration. They are particularly suitable for the metachroming dye-method and produce blue to blue-grey dyeings on wool which are distinguished by excellent fastness properties in the moist state and by a good light-fastness.

The invention will be illustrated by the following examples, without being limited thereto; the parts are by weight, unless otherwise stated.

Example 1

50.4 parts of 4-chlor-5-nitro-2-aminophenol-6-sulfonic acid are diazotised in an indirect way according to conventional methods. The diazo body is treated with small quantities of bicarbonate, until it reacts violet to Congo and then allowed to run into an ice-cold solution of 45.8 parts of 5:8-dichlor-1-naphthol in 680 parts of water made slightly mimosa-alkaline by addition of 30 parts by volume of 29% caustic soda lye. Then further 30 parts of calcined sodium carbonate and ice are added. After complete coupling the whole is heated to 90° C., salted out with 100 parts of sodium chloride and hot filtered.

The dyestuff dyes wool from an acid bath in red-violet shades being converted, when afterchromed, into light-fast blue-grey shades.

Example 2

60.6 parts of 3:4-dichlor-5-nitro-2-aminophenol-6-sulfonic acid are diazotised in water according to usual methods. The golden crystallised diazo body is treated with small quantities of bicarbonate until it reacts violet to Congo, then the mixture is introduced into a solution which is obtained by dissolving 44.6 parts of 5:8-dichloronaphthol in 680 parts of water, which was made mimosa-alkaline by addition of 28 parts by volume of 29% caustic soda lye. Then 33 parts of sodium carbonate and ice are added thereto. After several hours the dyestuff is filtered off.

The dyestuff dyes wool from an acid bath in blue-violet shades, which, on after-chroming or according to the one-bath chroming method, are converted into pure greenish shades.

The diazo component is made by producing benzoxazolone from the 3:4-dichlor-2-aminophenol-6-sulfonic acid by means of phosgene, nitrating the resulting benzoxazolone and again opening the oxazolone ring with alkaline agents, whereupon the o-aminophenol derivative is obtained.

What I claim is:

1. A chromable azo dyestuff of the formula

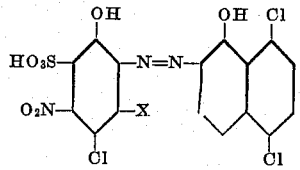

wherein X represents a member selected from the group consisting of H and Cl.

2. A chromable azo dyestuff of the formula

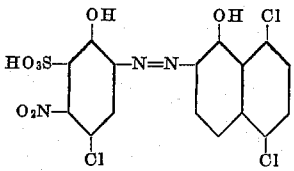

3. A chromable azo dyestuff of the formula

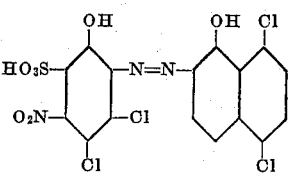

ACHILLE CONZETTI.

REFERENCES CITED

The following references are of record in the file of this patent:

UNITED STATES PATENTS

| Number | Name | Date |
|---|---|---|
| 2,109,806 | Straub et al. | Mar. 1, 1938 |
| 2,178,054 | Straub et al. | Oct. 31, 1939 |
| 2,305,747 | Straub et al. | Dec. 22, 1942 |
| 2,353,675 | Knecht et al. | July 18, 1944 |

FOREIGN PATENTS

| Number | Country | Date |
|---|---|---|
| 498,575 | Great Britain | June 10, 1939 |
| 513,337 | Great Britain | Oct. 10, 1939 |
| 517,558 | France | Dec. 18, 1920 |
| 541,692 | Great Britain | Dec. 8, 1941 |